Jan. 23, 1968    J. J. KURTZ ETAL    3,364,564
METHOD OF PRODUCING WELDING STUDS DISCHARGEABLE
IN END-TO-END RELATIONSHIP
Filed June 28, 1965    2 Sheets-Sheet 1
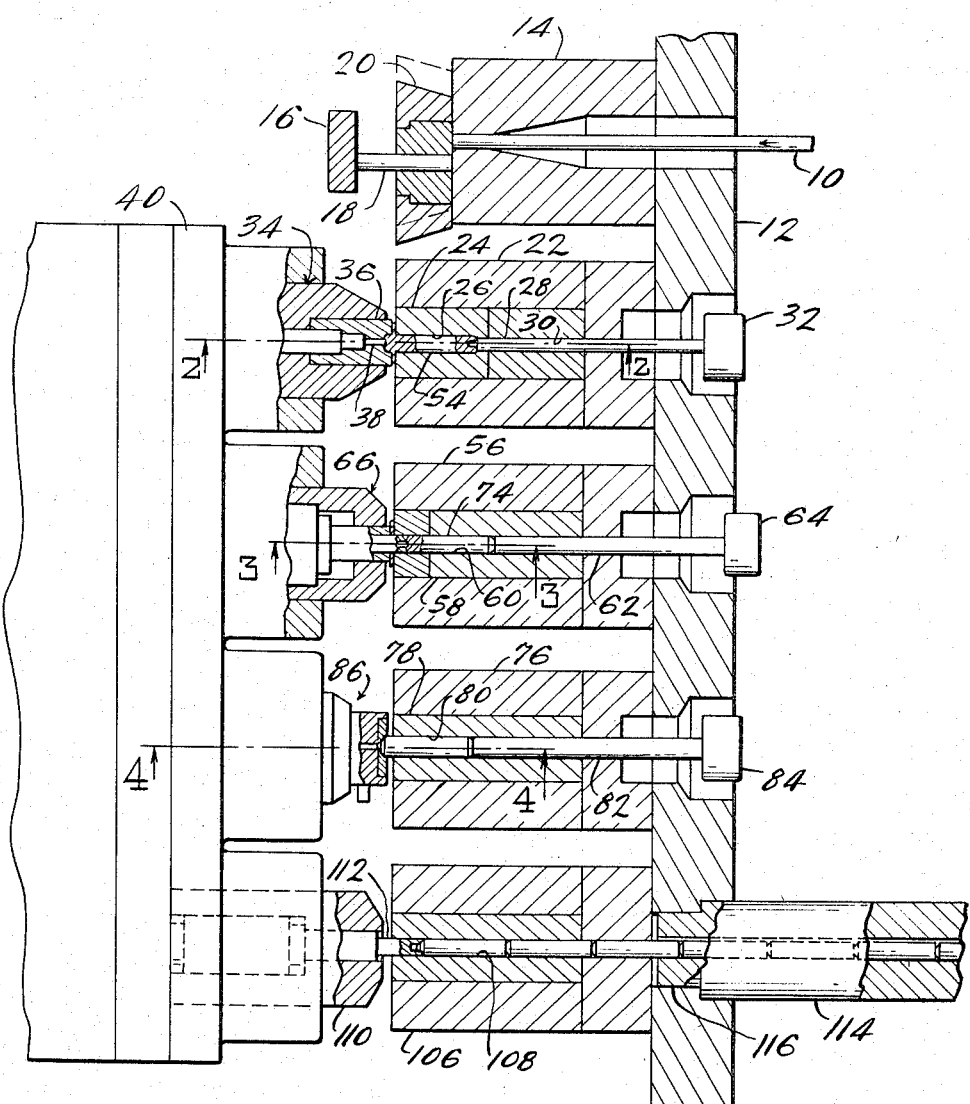
FIG-1-
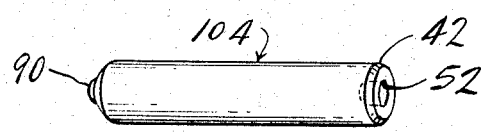
FIG-5-
INVENTORS:
JOSEPH J. KURTZ, DALE A. WEBSTER,
JOHN J. KURUCZ.
BY
ATT'YS.

Jan. 23, 1968
J. J. KURTZ ETAL
3,364,564
METHOD OF PRODUCING WELDING STUDS DISCHARGEABLE
IN END-TO-END RELATIONSHIP
Filed June 28, 1965
2 Sheets-Sheet 2
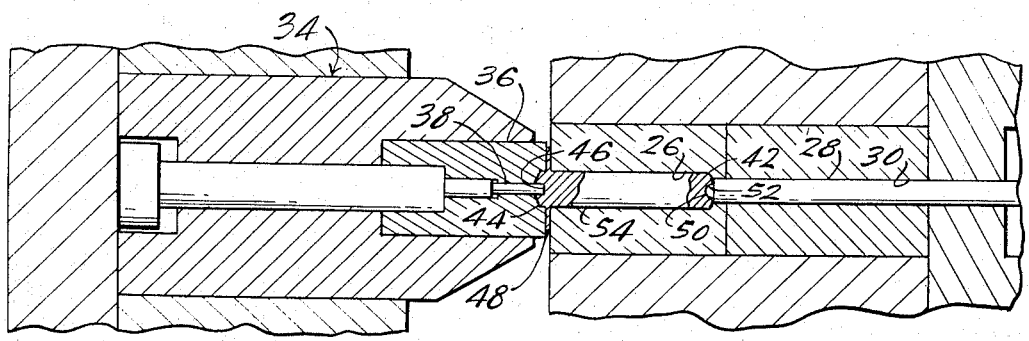
FIG-2-
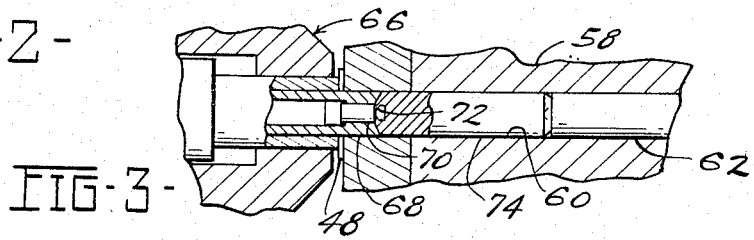
FIG-3-
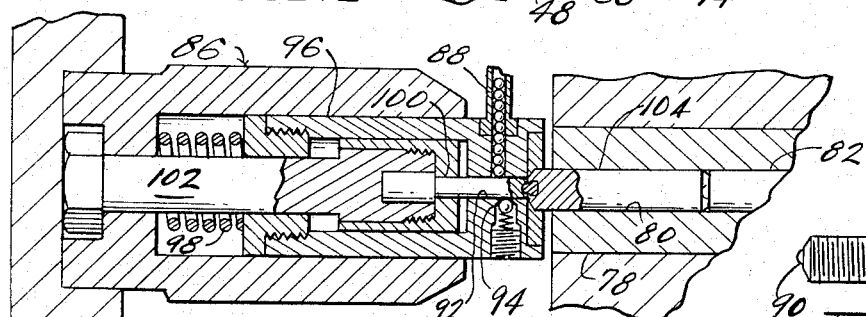
FIG-4-
FIG-8-
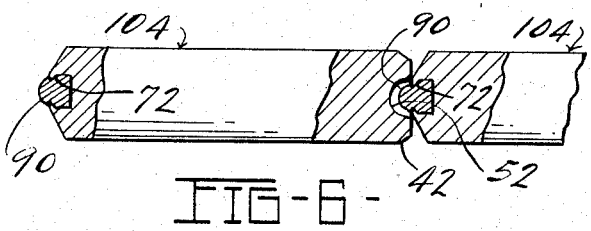
FIG-6-
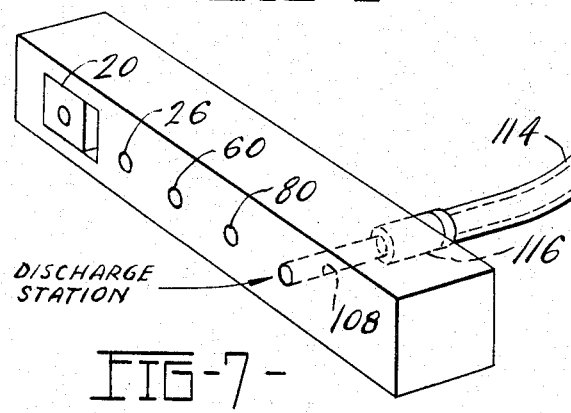
FIG-7-
INVENTORS:
JOSEPH J. KURTZ, DALE A. WEBSTER,
BY   JOHN J. KURUCZ.
ATT'YS.

United States Patent Office 3,364,564
Patented Jan. 23, 1968

3,364,564
METHOD OF PRODUCING WELDING STUDS DISCHARGEABLE IN END-TO-END RELATIONSHIP
Joseph J. Kurtz, Lorain, Dale A. Webster, Elyria, and John J. Kurucz, Lorain, Ohio, assignors to Gregory Industries, Inc., Lorain, Ohio, a corporation of Michigan
Filed June 28, 1965, Ser. No. 467,535
3 Claims. (Cl. 29—522)

This invention relates to a method of producing an end weldable stud and to a method and apparatus for making same.

A weldable stud of the type employing solid flux now can be made more rapidly, with fewer operations, and at less expense, as disclosed in our co-pending application, Ser. No. 397,259, filed Sept. 17, 1964, now Patent No. 3,269,000. A progressive-die machine or cold heading machine used in the manufacture of the stud can produce the stud completely, rod or bar stock coming into the machine at one portion and being removed from the machine as a completed stud at another portion. In some instances, however, additional operations are required on the studs, such as threading them, in addition to the usual washing and packaging operations.

It has been found that when the studs are transferred from the cold heading machine to the next operation, whether it be a threading operation or washing and packaging, the projecting body of flux produced on an end of the stud by the machine tends to be malformed by the next stud with which it is in end-to-end contact. The body of flux, usually aluminum, is relatively soft compared to the steel body of the stud. Further, when the transfer is effected by the cold heading machine, the studs are moved by a relatively sharp impact caused by a ram of the machine. Particularly where the studs in a long line are in end-to-end contact, the impact force of the ram during the transfer movement of the studs can be substantial and more than enough to seriously deform the bodies of flux. The shape of the flux is important in controlling the electrical arc established during the welding operation, and in controlling the initial positioning of the stud immediately prior to welding; hence, the flux shape is important in maintaining the quality of the overall weld.

In accordance with the instant invention, it has been found that the above problem can be overcome by providing a recess in the end of each stud opposite the flux end. The recess is centrally located in the end and is of a sufficient size that the flux body of an adjacent, aligned stud can project into the recess without contacting the stud at all, the edge of the recess opening contacting the end of the adjacent stud around the flux. Further, the recess in the stud can be formed during the production of the stud without requiring any special operations or additional stations on the cold heading machine. The recess can be produced while a flux recess for the flux body is being formed in the flux end of the stud. Consequently, the recessed stud can be produced in the same amount of time required for a conventional stud.

It is, therefore, a principal object to prevent the deformation of bodies of flux of studs during the manufacturing and handling thereof.

Another object of the invention is to provide a method of producing a stud having a recess at one end thereof larger than a body of flux at the opposite end to protect the flux body of an adjacent, similar stud.

Still another object of the invention is to provide a method of making studs wherein recesses can be formed in ends of the studs while flux recesses are formed in the opposite ends of the studs.

Other objects and advantages of the invention will be apparent from the following detailed description of a preferred embodiment thereof, reference being made to the accompanying drawing, in which:

FIG. 1 is a somewhat schematic plan view, with parts broken away and with parts in cross section, of a progressive-die machine or cold heading machine embodying the invention;

FIG. 2 is an enlarged, fragmentary view in vertical cross section of the second station of the machine of FIG. 1, taken along the line 2—2 of FIG. 1;

FIG. 3 is an enlarged, fragmentary view in vertical cross section of the third station of the machine of FIG. 1, taken along the line 3—3 of FIG. 1;

FIG. 4 is an enlarged, fragmentary view in vertical cross section of the fourth station of the machine of FIG. 1, taken along the line 4—4 of FIG. 1;

FIG. 5 is a view in perspective of one of the studs produced with the machine of FIG. 1, as the stud is discharged from the machine;

FIG. 6 is a view in elevation, with parts broken away and with parts in cross section, of two studs being fed in end-to-end relation from the machine of FIG. 1;

FIG. 7 is a schematic view in perspective of the machine of FIG. 1 and thread-rolling apparatus for the studs, along with a conveying tube connecting the cold heading machine and the thread-rolling apparatus; and FIG. 8 is a side view in elevation of a stud after threads are rolled thereon by the apparatus of FIG. 7.

Referring to the drawings, and more particularly to FIG. 1, five stations of a progressive-die or cold heading machine are shown somewhat schematically. In the first station, bar stock 10 is fed from a suitable source of supply through an opening in a bolster plate 12, through a guide block 14, and against a stop 16. A piece 18 of bar stock of predetermined length is then severed by a cutter 20 which moves transversely to the guide block 14 and shears the piece 18.

The stock piece 18 is then transferred to a second station in which ends of the stud are shaped and recessed. The station includes a die body or holder 22 supporting a first die 24 having a recess 26 therein. A first ejector or forming pin 28 is aligned with the die recess 26 and extends through an end opening 30 concentric with the recess 26. The ejector pin 28 has a driving head 32 which is driven by any suitable arrangement (not shown), such as a cam and drive shaft combination. The ejector pin is operated in timed relation to heading and forming mechanism hereinafter described. Aligned with the die recess 26 is a first hammer 34 which includes a heading die 36 and a punch 38. The hammer 34 is supported and driven by a main ram 40 which is driven through a suitable crank or cam mechanism (not shown) to impart the required periodic strokes to the hammer 34 and other hammers to be subsequently discussed.

The hammer 34 is held in a retracted position while the stock piece 18 is moved between it and the die 24. The hammer is then moved forwardly with one end of the stock piece 18 entering a recessed end of the heading die 36 until contacting the punch 38, and with the other end entering the die 24 until contacting the ejector pin 28. At this time, as the hammer 34 continues to move forwardly toward the die 24, it applies additional pressure to the stock piece 18. As shown more particularly in FIG. 2, a beveled portion 42 then is formed on the stock piece 18 by the end of the recess 26 and a truncated conical end 44 is formed on the opposite end of the stock piece by the heading die 36. Further, a flux recess 46 is formed in the conical end 44 by the punch 38. A flash collar 48 also is formed on the stock piece as the conical end 44 is shaped by the heading die 36.

As the above operations take place, a rounded pin extension 50 of the ejector pin 28 forms a generally hemispherical clearance recess 52 in the stock piece, the recess 52 being sufficiently large to receive a flux body, as will be discussed subsequently.

The partly formed die piece now designated 54 is transferred to a third station (see also FIG. 3) where the weldable end of the stud is further shaped and the flash collar 48 is removed. The third station includes a second die body 56 having a second forming die 58 with a die recess 60. A second ejector pin 62 extends into the die 58 and also has a driving head 64. A second hammer 66 is located at the third station and includes a punch 68 having a punch insert 70.

When the partly finished stock piece 54 is moved between the die 58 and the hammer 66, the piece is pushed into the die recess 60 until reaching the ejector pin 62, the collar 48 being sheared from the stock piece. At this time, a pair of radially inwardly extending crimps 72 (also see FIG. 6) are formed on the end 44 of the stock piece at the opening of the recess 46, by virtue of the punch insert 70. If required, the flux body clearance recess 52 can be further formed to final shape in the third station if this cannot be done in one step in the second station. In either instance, however, no additional time is required to form the clearance recess.

The further partially formed stock piece, designated 74, is then transferred to a fourth station (see FIG. 4 also) wherein the flux is added to the stud and shaped. The fourth station includes a die support 76 holding a die 78 having a recess 80 and an ejector pin 82 having a driving head 84 extending into the recess 80 to back up the stock piece 74 as a loading operation is performed thereon.

A hammer 86 includes loading mechanism for ramming a ball 88 in the now-crimped recess 46 and for shaping the ball to produce a projecting portion 90 (FIG. 6) of generally conical shape, with a rounded end portion. The balls 88 are fed one at a time to a loading passage 92 where they are held by a spring-loaded detent 94. The passage 92 is located in a slidable holder 96 which moves rearwardly when the hammer 86 is moved toward the die 78 and when the force of a spring 98 is overcome. A loading and forming punch 100 in the passage 92 is held in a fixed position by a supporting bolt 102 so that the punch 100 moves relative to the passage 92 and moves one of the flux balls 88 into the recess 46 as the holder 96 is moved rearwardly and the stock piece is moved toward the punch 100. The loading and shaping of the flux 90 is the fourth station completes the operations on the stud in the cold heading machine, with the completed stud being designated 104 in FIG. 5.

The studs 104 are next moved to a fifth, discharge station (FIG. 1) including a holder 106 having a discharge passage 108 for the studs. A hammer 110 includes a discharge punch 112 which simply engages the conical end of the stud 104 when the ram is moved forwardly to move the studs 104 approximately a stud length through the passage 108. At the rear of the passage 108 is a conveyor tube 114 communicating with the passage 108 through a connection 116. The conveyor tube 114, as shown in FIG. 7, directs the studs 104 from the discharge station to the next operation. The next operation in this instance constitutes a thread rolling machine 118 which has a table 120 rotatable in the direction shown. The studs 104 are fed through the conveyor tube 114 to a discharge device 122 from which they drop one at a time to an on-end position on the table 120 and are carried between the sidewall of the table 120 and a thread rolling member 124. As the table 120 rotates, the studs 104 are squeezed between the sidewall and the member 124 and threads rolled thereon, in a well known manner. The final threaded stud is designated 126 in FIG. 8.

The flux projections 90 of the studs 104 normally would be quickly deformed by the beveled ends 42 of the adjacent stud as they are shoved along the conveyor tube 114. This is particularly true where a portion of the tube 114 must be raised above the discharge station of the cold heading machine with the result that considerable pressure is placed upon the studs due to friction and to the weight of the studs in the tube. Further, the force on the first stud is applied rapidly and with considerable magnitude by the discharge punch 112. Consequently, the studs are placed under substantial compressive force even if the conveyor tube 114 does not extend upwardly after leaving the discharge station. As long as two or three studs are in end-to-end relationship in the passage 108, the flux projections 90 are subject to deformation as the discharge punch 112 engages and moves the first stud in the passage 108 relatively sharply toward the tube 114.

With the studs 104 and 126 according to the invention, the force between the adjacent ends of the studs is not applied to the flux projection 90 but, by virtue of the recess 52, is applied to the conical end 44 of the stud circumjacent the projection 90. Hence, only steel-to-steel contact is established between the conical end 44 and the annular portion of the beveled end 42 around the opening of the recess 52. The recess 52 does not interfere with the strength of the stud nor with the threads when formed thereon, nor does it in any other manner detract from the function of the stud.

While the studs formed by the cold heading machine are shown as being threaded by the thread rolling machine 118, the invention and advantages thereof equally apply if the next operation for the studs is simply washing or packaging or some other step. Further, as pointed out above, the invention is beneficial even though the tube 114 is not used but only a few of the studs are fed through the discharge passage 80 in end-to-end relationship.

Various modifications of the above described embodiment of the invention will be apparent to those skilled in the art, and it is to be understood that such modifications are within the scope of the invention, if they are within the spirit of the depending claims.

We claim:

1. A method for producing a weldable stud having an end thereof to be welded to a surface, said method comprising producing a piece of bar stock of predetermined length, simultaneously forming a truncated conical end on one end of said piece and a bevel on the opposite end of said piece and simultaneously producing opposed coaxial recesses in the opposite ends of said piece with the recess in the beveled end being of generally hemispherical shape, crimping the recess at said conical end of said stud, filling said crimped recess with flux and shaping a projecting portion of said flux, and discharging the stud in end-to-end relationship with other studs such that said flux portions of the studs project into the hemispherical recesses in the preceding studs without said flux portions of the studs contacting the walls of the recesses in the preceding studs.

2. A method for producing a weldable stud having an end thereof to be welded to a surface, said method comprising producing a piece of bar stock of predetermined length, forming a truncated conical end on one end of said piece, simultaneously producing opposed coaxial recesses in the opposite ends of said piece with the recess in the end opposite the conical end being of generally hemispherical shape, filling the recess at the conical end with flux and shaping a projecting portion of said flux, and discharging the stud in end-to-end relationship with other studs such that said flux portions of the studs project into the hemispherical recesses in the preceding studs without said flux portions of the studs contacting the walls of the recesses in the preceding studs.

3. A method for producing a weldable stud having an end thereof to be welded to a surface, said method comprising providing a piece of bar stock of predetermined length, shaping one end of said piece, producing coaxial recesses in the opposite ends of said piece, filling the recess in the shaped end with flux and shaping a projecting portion of the flux, and discharging the stud in end-to-end relationship with other studs such that said flux portions of the studs project into the recesses in the other ends of the preceding studs without said flux portions of the studs contacting the walls of the recesses in the other ends of said preceding studs.

References Cited

UNITED STATES PATENTS

| | | | |
|---|---|---|---|
| 1,701,736 | 2/1929 | Timken | 29—417 X |
| 1,860,605 | 5/1932 | Baldwin | 29—417 X |
| 2,036,758 | 4/1936 | Johnson | 29—417 X |
| 2,816,210 | 12/1957 | Mowry | 219—98 |
| 2,885,228 | 5/1959 | Kelemen | 287—20.2 |
| 3,209,437 | 10/1965 | Voorhies | 29—522 X |
| 3,254,196 | 5/1966 | Mowry et al. | 287—20.2 |

CHARLIE T. MOON, *Primary Examiner.*